(12) United States Patent
Alstrup et al.

(10) Patent No.: US 8,996,646 B2
(45) Date of Patent: Mar. 31, 2015

(54) PEER OF A PEER-TO-PEER NETWORK AND SUCH NETWORK

(75) Inventors: Stephen Alstrup, Bagsværd (DK); Theis Rauhe, København K (DK)

(73) Assignee: Codemate A/S (DK)

( * ) Notice: Subject to any disclaimer, the term of this patent is extended or adjusted under 35 U.S.C. 154(b) by 1129 days.

(21) Appl. No.: 11/631,281

(22) PCT Filed: Jul. 9, 2004

(86) PCT No.: PCT/DK2004/000498
§ 371 (c)(1),
(2), (4) Date: Dec. 29, 2006

(87) PCT Pub. No.: WO2006/005334
PCT Pub. Date: Jan. 19, 2006

(65) Prior Publication Data
US 2007/0233840 A1    Oct. 4, 2007

(51) Int. Cl.
G06F 15/173 (2006.01)
H04L 29/08 (2006.01)
(52) U.S. Cl.
CPC .............. H04L 67/104 (2013.01); H04L 67/14 (2013.01); H04L 67/1068 (2013.01)
USPC ........................................................ 709/217
(58) Field of Classification Search
USPC .................................. 709/223, 243; 370/351
See application file for complete search history.

(56) References Cited

U.S. PATENT DOCUMENTS

| | | | |
|---|---|---|---|
| 6,073,250 A | 6/2000 | Luby | |
| 6,081,909 A | 6/2000 | Luby | |
| 6,633,911 B1 | 10/2003 | Matsuzaki | |
| 7,036,138 B1 | 4/2006 | Tash | |
| 7,149,893 B1 | 12/2006 | Leonard | |
| 7,474,631 B2 | 1/2009 | Dube | |
| 7,581,158 B2 | 8/2009 | Alstrup | |
| 7,827,296 B2 | 11/2010 | Zuckerman | |
| 7,865,609 B2 | 1/2011 | Liu | |
| 7,865,811 B2 | 1/2011 | Alstrup | |
| 8,078,946 B2 | 12/2011 | Alstrup | |
| 2002/0062375 A1 | 5/2002 | Teodosiu et al. | |
| 2002/0085030 A1 | 7/2002 | Ghani | |
| 2002/0087592 A1 | 7/2002 | Ghani | |

(Continued)

OTHER PUBLICATIONS

A. Rowstron and P. Druschel. Pastry: Scalable, decentralized object location and routing for large-scale peer-to-peer systems. Proc. of the 18th IFIP/ACM International Conference on Distributed Systems Platforms (Middleware 2001), Heidelberg, Germany, Nov. 2001.*

(Continued)

*Primary Examiner* — Scott B Christensen
(74) *Attorney, Agent, or Firm* — Cantor Colburn LLP

(57) ABSTRACT

The invention relates to a peer-to-peer network where said peer-to-peer network comprises a plurality of peers (P), wherein said peer (RP) comprises and maintains a communication record (CR) defining a plurality of candidate peers (CP) from which information representative data (S) may be downloaded, wherein said plurality of candidate peers (CP) comprises a subset of said plurality of peers (P), and wherein said peer (RP) comprises means for downloading said information representative data (S) from at least one of said candidate peers (CP) according to an individual routine of said peer (RP). The invention furthermore relates to a peer-to-peer network comprising a plurality of peers (P) according to the above.

55 Claims, 8 Drawing Sheets

(56) References Cited

U.S. PATENT DOCUMENTS

Figure 1:
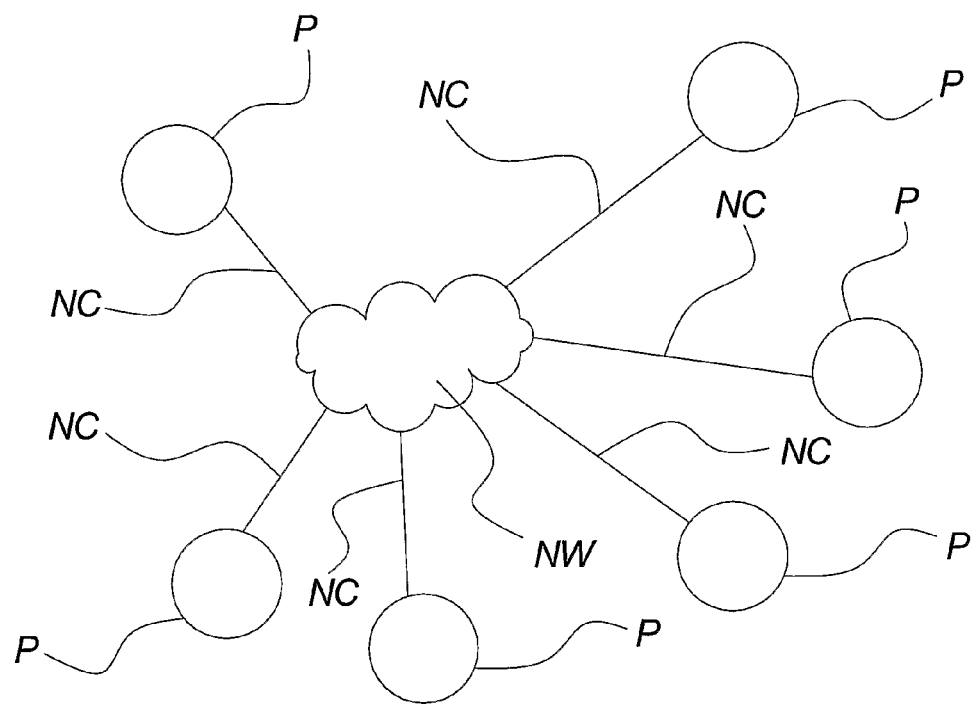

| | | |
|---|---|---|
| 2002/0129159 A1 | 9/2002 | Luby |
| 2002/0184310 A1* | 12/2002 | Traversat et al. ............. 709/204 |
| 2003/0093548 A1 | 5/2003 | Cinghita |
| 2003/0126056 A1 | 7/2003 | Hausman |
| 2003/0126199 A1* | 7/2003 | Kadri et al. .................. 709/203 |
| 2003/0226089 A1 | 12/2003 | Rasmussen |
| 2004/0107242 A1 | 6/2004 | Vert |
| 2005/0004985 A1 | 1/2005 | Stochosky |
| 2005/0004995 A1 | 1/2005 | Stochosky |
| 2005/0281404 A1 | 12/2005 | Yu |
| 2006/0153100 A1 | 7/2006 | Dube |
| 2006/0173965 A1 | 8/2006 | Yang |

OTHER PUBLICATIONS

B. Cohen. Incentives build robustness in bittorrent. In Workshop on Economics of Peer-to-Peer Systems, Berkeley, USA, May 2003.*

International Search Report; PCT/FR2005/001887; Feb. 6, 2006.

Clarke I et al: "Freenet: a distributed anonymous information storage and retrieval system" Proceedings of the International Workshop on Design Issues in Anonymity and Unobservability, XX, XX, Jan. 2001, pp. 1-21, XP002974738.

Ratnasamy S et al: "A Scalable Content-Addressable Network" Computer Communication Review, Association for Computing Machinery. New York, US; vol. 31, No. 4, Oct. 2001, pp. 161-172, XP001115754; ISSN: 0146-4833.

Hefeeda M M et al: "A hybrid architecture for cost-effective on-demand media streaming" Computer Networks, Elsevier Science Publishers B.V., Amsterdam, NL, vol. 44, No. 3, Feb. 20, 2004, pp. 353-382, XP004483258; ISSN: 1389-1286.

Byers J W et al: "A Digital Fountain Approach to Reliable Distribution of Bulk Data" Computer Communication Review, Association for Computing Machinery, New York, US, vol. 28, No. 4, Oct. 1998, pp. 56-67, XP000914424; ISSN: 0146-4833.

Byers J W et al: "A Digital Fountain Approach to Asynchronous Reliable Multicast" IEEE Journal on Selected Areas in Communications, IEEE Inc. New York, US, vol. 20, No. 8, Oct. 2002, pp. 1528-1540; XP001168306; ISSN: 0733-8716.

Geoffrey Fox, et al.; "A Scaleable Event Infrastructure for Peer to Peer Grids"; Nov. 3 5, 2002; pp. 66-75.

James S. Plank, et al.: "On the Practical Use of LDPC Erasure Codes for Distributed Storage Applications" UT-CS-03-510, 'Online! vol.—, Sep. 20, 2003, pp. 1-15, XP002302221; Retrieved from the Internet URL:http://www.cs.utk/edu/{plank/plank/papers/CS-03-510.html>.

Nazareno Andrade, et al.; "OurGrid: An Approach to Easily Assemble Grids with Equitable Resource Sharing"; JSSPP 2003, LNCS 2862, pp. 61-86, 2003; Springer-Verlag Berlin Heidelberg 2003.

* cited by examiner

PEER OF A PEER-TO-PEER NETWORK AND SUCH NETWORK

FIELD OF THE INVENTION

The present invention relates to means facilitating autonomy and decentralisation within peer-to-peer networks.

BACKGROUND OF THE INVENTION

Several peer-to-peer network technologies exist mainly in order to provide networks where the sharing of files or distribution of large files or live information is sought improved. The main part of these technologies comprises a central server that keeps track of the connected peers as well as the structure by which they are connected. Many of these systems comprise relatively fixed structures and heavily centralised control in order to enable the server to manage it tasks. In these systems the individual peers have to obtain permission or instructions from the server if they want to relocate themselves in the structure, or otherwise want changes. A few systems occasionally leave certain simple decisions within very restricted scopes to the peers, but if the decisions affect the structure or status of the peers they will still have to inform the server of any changes.

Thus, traditional peer-to-peer systems are typically restricted by inflexibility, centralisation and thereby, at least for the server, huge communication and processing overhead regarding control information.

SUMMARY OF THE INVENTION

The present invention relates to a peer of a peer-to-peer network where said peer-to-peer network comprises a plurality of peers P, wherein said peer RP comprises and maintains a communication record CR defining a plurality of candidate peers CP from which information representative data S may be downloaded, wherein said plurality of candidate peers CP comprises a subset of said plurality of peers P, and wherein said peer RP comprises means for downloading said information representative data S from at least one of said candidate peers CP according to an individual routine of said peer RP.

According to the invention, the information representative data S is preferably a representation of a live video or audio stream or a part thereof, but may be any kind of information available for encoding into a network transmittable format, e.g. media files, document files, computer programs, databases, etc. The information representative data S may represent such information by available encoding, and further encoding or decoding may be applied during the distribution process. The information representative data S may during distribution be contained by a single self-contained data packet or stream of packets, or it may be subject to an encoding that establishes a plurality of data packets, whereof a certain amount represents the information representative data S, e.g. a loss resiliency enabling encoding. When the last-mentioned applies, networks based on a grid structure are facilitated as the different packets may be distributed along different paths.

According to the invention a candidate peer from which information representative data may be downloaded represents a peer that may be contacted with download requests, but the status of candidate peer does not necessarily imply that download from the candidate peer will be possible. A candidate peer may e.g. momentarily or permanently on it's own discretion due to internal or external circumstances choose not to serve a download request. Such circumstances may e.g. comprise the number of other peers requesting downloads from the same candidate peer, the amount of bandwidth a candidate peer prefer to preserve for other uses such as e-mail and internet browsing, the identity or the geographical or network topological location of the requesting peer, etc. The communication record thus comprises a number of peers that potentially may be used for downloading and among which a peer may make its own experiences in order to determine which peers to download from rather than being told from a central root peer or server where to download from. Thereby an autonomous flexible adaptive self-organizing network is facilitated.

Elsewhere in the description, the abovementioned peer is also referred to as a recipient peer due to the fact that the general purpose of the peer is to receive information representative data and optionally upload information representative data or variants thereof to other peer(s).

According to the present invention, downloading may comprise an active or a reactive transmission of data. In other words the peer may actively initiate and be in charge of the download, or it may more passively receive a download initiated by a sender.

A peer-to-peer network for distributing information among a plurality of peers, wherein control data enabling or facilitating a peer to receive said information is at least partially distributed in association with or comprised by said information, is provided.

When said peer RP acts substantially autonomously within said peer-to-peer network, an advantageous embodiment of the present invention is obtained.

By means of the present invention, in particular the distributed communication record, each peer comprises information on which it may base decision. Thus, the peer needs neither obtain permission or instructions from a server before taking a decision nor inform the server of the outcome after taking a decision.

When said peer RP performs said maintaining said communication record CR at least partly on the basis of communication record updates CRU, an advantageous embodiment of the present invention is obtained.

According to the present invention, the peer may maintain the communication record by processing communication record updates. Such updates preferably comprise merely changes, i.e. additions, deletions and updates, to the communication record, but may comprise any kind of information, e.g. a full copy of the communication record, which may facilitate the maintaining task.

When said peer RP further comprises means for downloading said communication record updates CRU on a runtime basis, an advantageous embodiment of the present invention is obtained.

The peer may maintain the communication record on a runtime basis by frequently, whether regularly or irregularly, directly or indirectly, receiving updates.

According to the present invention, downloading may comprise an active or a reactive transmission of data. In other words the peer may actively initiate and be in charge of the download, or it may more passively receive a download initiated by a sender.

When said downloading said communication record updates CRU on a runtime basis is performed according to said individual routine of said peer, an advantageous embodiment of the present invention is obtained.

When said peer RP substantially autonomously may decide to download or request download from candidate peers CP currently defined by said communication record CR, an advantageous embodiment of the present invention is obtained.

According to the present invention, the term autonomously may refer to the peer being able to take decisions on any or all of several different options, e.g. when to do something, e.g. request a download, who to contact about something, e.g. which candidate peers to request download from, what services to provide to other peers, etc.

When said individual routine comprises guidelines for deciding, on a runtime basis, which at least one of said candidate peers CP to download said information representative data S from, an advantageous embodiment of the present invention is obtained.

According to an embodiment of the invention autonomy is facilitated in that the peers may each decide which of the candidate peers defined in the communication record to download from, and they may reconsider their decision freely whenever necessary or convenient.

When said individual routine comprises guidelines for deciding, on a runtime basis, a number of said candidate peers CP to download said information representative data S from, an advantageous embodiment of the present invention is obtained.

According to an embodiment of the invention autonomy is facilitated in that the peers may each decide how many of the candidate peers defined in the communication record to download from, and they may reconsider their decision freely whenever necessary or convenient.

According to an embodiment of the invention grid based networking is furthermore enabled by the choice each peer has of downloading from more than one candidate peer.

When said peer RP downloads said information representative data S from a plurality of said candidate peers CP substantially simultaneously, an advantageous embodiment of the present invention is obtained.

According to an embodiment of the invention, the peer-to-peer network is a grid-based network as each peer downloads from a plurality of candidate peers substantially simultaneously in order to gather the information representative data, e.g. live video or audio stream. When the information representative data S is encoding in a way establishing a plurality of data packets whereof a certain amount represents the information representative data S, e.g. for loss resilient distribution, the different packets may be downloaded from different candidate peers, and without the need of keeping track of order.

According to the present invention, the term substantially simultaneously may refer to the impression received at any of the implemented communication layers, e.g. the physical layer, the transport layer, the application layer, etc. While it is typically impossible to actually receive, at the lowest level, data from different packets simultaneously, it may however seem like a simultaneous reception from the transport layer, the application layer, etc., and such pseudo-simultaneity is within the scope of the present invention as well as true simultaneity.

When at least one peer P of said plurality of peers P comprises a peer-to-peer network server PPS, an advantageous embodiment of the present invention is obtained.

It is emphasized that in principle any of the peers may act as a server in a certain embodiment of the invention, whereas it however typically may comprise an over-average hardware implementation regarding, e.g., network bandwidth, processor power, storage space, etc.

When said peer-to-peer network server PPS transmits said information representative data S to at least one of said plurality of peers P of said peer-to-peer network, an advantageous embodiment of the present invention is obtained.

According to the present invention, a server is provided for acting as an information broadcaster, e.g. for hosting a live streaming session, etc.

When a plurality of said peers P are associated with a unique identity representation ID, an advantageous embodiment of the present invention is obtained.

According to an embodiment of the invention an identity representation ID should enable direct or indirect addressing of the associated peer. An ID may e.g. comprise or define an IP address or a MAC address of the peer associated with the unique identity representation.

When said communication record CR defines said candidate peers CP by said associated identity representation ID, an advantageous embodiment of the present invention is obtained.

When said communication record CR is initialized and updated on a runtime basis by at least one of said candidate peers CP, an advantageous embodiment of the present invention is obtained.

The candidate peer may maintain the communication records on a runtime basis by frequently, whether regularly or irregularly, directly or indirectly, transmitting update information to the peer or the peers of which the candidate peer is kept as such in the communication record. When applying an indirect addressing, initializing and/or maintaining of the communication records of a recipient peer is performed by at least one or some of the candidate peers. Evidently, this candidate peer, unless the candidate peer is the server, will have to receive update information from other upstream peers. Still, upstream, the server will serve as the origin of information data and updating information streaming through the peer-to-peer network although the direct communication to a recipient peer is actually performed by one or some candidate peers.

When maintaining such communication record at the individual peer, an advantageous establishment of download from candidate peers may be obtained as the individual peer, instantly and without time consuming communication and authorization from a server, may decide and try to reconfigure the downloading solely on the basis of information kept in the communication record of the peer.

When said communication record CR is initialized and updated on a runtime basis by said server PPS, an advantageous embodiment of the present invention is obtained.

The direct updating and/or initialization of the peer involve a more direct updating and maintenance of the communication records of the individual peers. However, it should be noted that the information representative data are still received from the candidate peers defined in the maintained communication record of each peer. When maintaining such communication record at the individual peer, an advantageous establishment of download from candidate peers may be obtained as the individual peer, instantly and without time consuming communication and authorization from a server, may decide and try to reconfigure the downloading solely on the basis of information kept in the communication record of the peer.

When said information representative data S comprises a video or audio stream, an advantageous embodiment of the present invention is obtained.

The present invention may be particularly advantageous when applied to a distribution system for preferably live video or audio streams. Any information type of the information representative data is however within the scope of the present invention.

When said peer-to-peer network comprises a streaming network, an advantageous embodiment of the present invention is obtained.

When said peer-to-peer network comprises a grid-based peer-to-peer network, an advantageous embodiment of the present invention is obtained.

When said communication records CR of a plurality of peers P of said peer-to-peer network are substantially identical, an advantageous embodiment of the present invention is obtained.

According to an embodiment of the invention the communication records are substantially identical, which means that the peers recognize the same set of candidate peers. A peer may however at certain times comprise a slightly different knowledge than the other peers. This may happen if the peer for some reason has not received maintenance updates for its communication record, or if it has been into contact with a peer not identified by the communication record. The last situation may in certain embodiments occur when new peers join the network and the corresponding communication record update has not propagated through the network before the new peers begin to communicate within the network. Any differences are however preferably corrected before long, i.e. within the order of the time for a few consecutive communication record updates to propagate through the network.

When said communication record CR defines a subset of said plurality of peers P of said peer-to-peer network to which information representative data S may be uploaded, an advantageous embodiment of the present invention is obtained.

By also using the communication record to identify peers that may request downloads, i.e. that the peer comprising the communication record may upload to, it is possible to exercise an authentication policy. This may, e.g., be necessary in systems utilizing the public Internet, in order to avoid that unauthorized peers that somehow has obtained knowledge about a candidate peer, may start downloading the data, and thereby also in certain embodiments the communication record updates. Moreover this may be utilized in a system where the information representative data comprises several information channels, e.g. several video or audio streams, media files, etc., as the peers may then be able to lookup which peers are allowed to request download of a specific content.

When at least two of said plurality of peers P of said peer-to-peer network downloads said information representative data S substantially simultaneously, an advantageous embodiment of the present invention is obtained.

According to an embodiment of the invention several peers may be receiving the information representative data, preferably a live video or audio stream, substantially simultaneously. A live streaming system with the potential of serving numerous recipients simultaneously is thus facilitated. The peers may download the information from the same peer or from several different peers, or any combination thereof.

The term substantially simultaneously may comprise the peers requesting downloads substantially simultaneously as the duration of a download may differ widely over the network according to several parameters. It may furthermore comprise the peers requesting downloads within the same time window of the information broadcast.

When said peer-to-peer network server PPS furthermore transmits said communication record update CRU to at least one of said plurality of peers P of said peer-to-peer network, an advantageous embodiment of the present invention is obtained.

By having the server controlling the communication record updates, a substantial synchronization through the network is ensured. Moreover the server already comprises the framework for maintaining the broadcast of the information representative data.

When said information representative data S is arranged to comprise said communication record update CRU, an advantageous embodiment of the present invention is obtained.

By combining the information representative data and the communication record update into a single broadcast unit it is ensured that all peers receiving the information will also receive the updates, and thus it is be ensured that peers at least have the possibility of staying current. Moreover it simplifies the distribution and the tasks performed by the peers when all necessary information is transmitted in a bundle.

When said communication record update CRU is associated and transmitted with said information representative data S, an advantageous embodiment of the present invention is obtained.

When accumulated said communication record updates CRU on the average accounts for less than 20%, preferably less than 10% and even more preferably less than 2% of the size of accumulated said information representative data S, an advantageous embodiment of the present invention is obtained.

Of the accumulated data downloaded by a recipient peer preferably only a relatively small part should be accounted for by the communication record updates. Hence, the main part of the available resources, in particular network bandwidth, should be used for distribution of the information, e.g. streaming video.

However, certain applications of the present invention may on the contrary be most efficient when allocating the resources differently or the kind of the communication record data and/or the information representative data may be of such composition that the above-mentioned preferred allocation is impossible or less efficient. Embodiments of the present invention may therefore within the scope of the invention cause any distribution of the resources between the communication record related communication and the information related communication.

When said communication record update CRU comprises changes of said communication record CR, an advantageous embodiment of the present invention is obtained.

In order to avoid unnecessary overhead and redundant information, the communication record updates comprises only the changes of the communication record since last update. This requires all peers to carefully maintain the communication records in order to not introduce errors.

When said communication record update CRU comprises a complete communication record CR, an advantageous embodiment of the present invention is obtained.

In an alternative embodiment of the invention a complete copy of the communication record is transmitted with every update, or occasionally for each some number of regular updates. In a further alternative embodiment a method for occasionally comparing a communication record with the record of other peers or the server may be implemented.

When said communication record CR defines further properties or features of the peers it defines, an advantageous embodiment of the present invention is obtained.

The communication may, e.g., comprise any set of information that may serve to support the peer in its tasks within the network. Such information may thus comprise, e.g., categorization information about the individual peers or groups of peers, performance information about the individual peers, groups of peers or different network parts, information about network topology or other structural information, routing information, information about the computer configuration individual peers or groups of peers, e.g. NAT configuration, compatibility information, authorization and/or cryptography information, etc.

When said communication record CR defines properties or features of said information representative data S, an advantageous embodiment of the present invention is obtained.

In certain embodiments of the invention the information representative data may represent several different information channels, e.g. several video or audio streams, different media files, etc. By including information about the data within the communication record the peers obtain a basis for deciding which data they want to request, and it is ensured that this information is always current.

When said information representative data S is encoded and distributed according to a loss resiliency method, an advantageous embodiment of the present invention is obtained.

When said information representative data S is distributed according to a pull-strategy, an advantageous embodiment of the present invention is obtained.

This preferred embodiment comprises the recipient peers requesting downloads when they want, of what they want and/or from whom they want, i.e. pulling data through the network.

When said information representative data S is distributed according to a push-strategy, an advantageous embodiment of the present invention is obtained.

This embodiment comprises the candidate peers requesting uploads when they want, of what they want and/or to whom they want, i.e. pushing data through the network.

When said communication record update CRU is distributed by a method corresponding to the method applied for distributing information representative data S, an advantageous embodiment of the present invention is obtained.

Regarding distribution of the communication record updates to several or all peers, the same distribution method as used for distribution of the information representative data may advantageously be used. Thereby it may in preferred embodiments be possible to use the same framework of structures, configurations, software and hardware for both distribution tasks.

When said information representative data S may comprise multiple information instances, an advantageous embodiment of the present invention is obtained.

The system may be used for distributing several different information instances by the same distribution framework. Such instances may, e.g., comprise live video and/or audio streams, on demand video and/or audio streams, computer programs, media files, documents, databases, etc.

When said communication record CR defines said information instances of said information representative data S, an advantageous embodiment of the present invention is obtained.

If the information representative data comprises several different information instances, e.g. several video streams, these may advantageously be defined by the communication record, thus facilitating the peers to choose among the information contents.

When said candidate peers CP are not equally performing, an advantageous embodiment of the present invention is obtained.

According to the present invention, the communication record should define candidate peers in order to facilitate autonomous decision-making at the recipient peers. Hence, the communication record should preferably define substantially all possible or relevant peers as candidate peers. Naturally some of the candidate peers may then be less successful choices of a certain recipient peer due to, e.g., network properties or properties of the candidate peers.

When said individual routine comprises trial and error algorithms, an advantageous embodiment of the present invention is obtained.

By using trial and error for, e.g., deciding which candidate peers to make use of, a simple, yet rather effective, decision method is applied. Whereas such a method from a beginning performs as ineffective as pure random selection, it may during use become more and more effective, depending on the degree of memorization of previous tries.

The present invention further relates to a peer-to-peer network comprising a plurality of peers P according to any of the claims mentioned with regard to said peer of a peer-to-peer network

THE DRAWINGS

Figure 2:
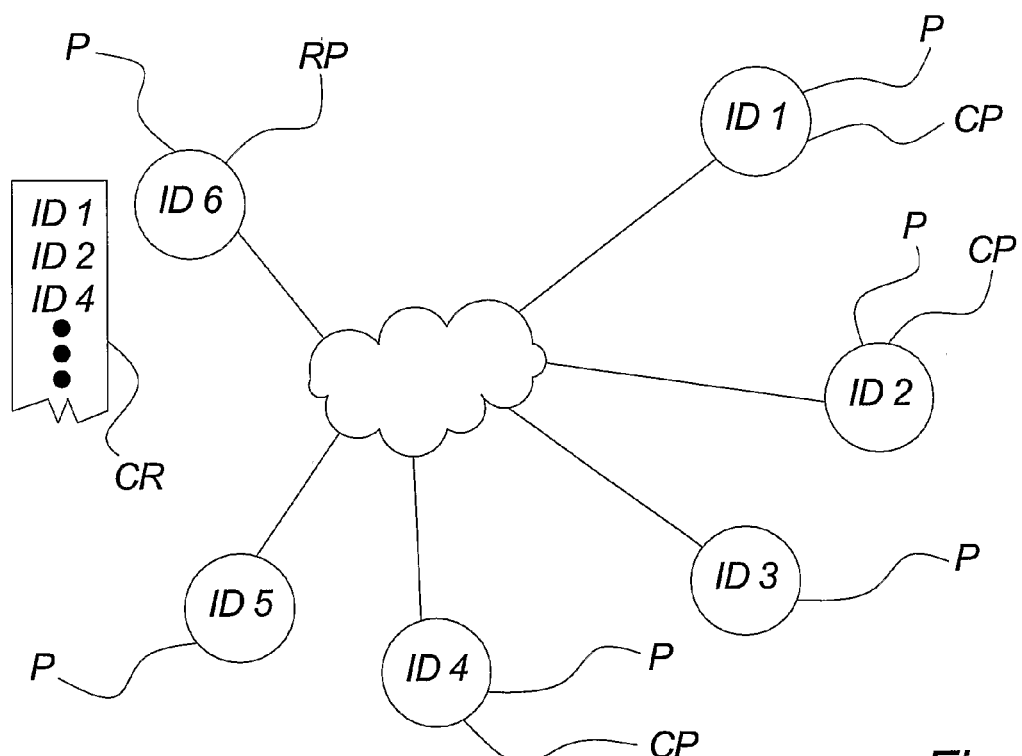
Figure 3:
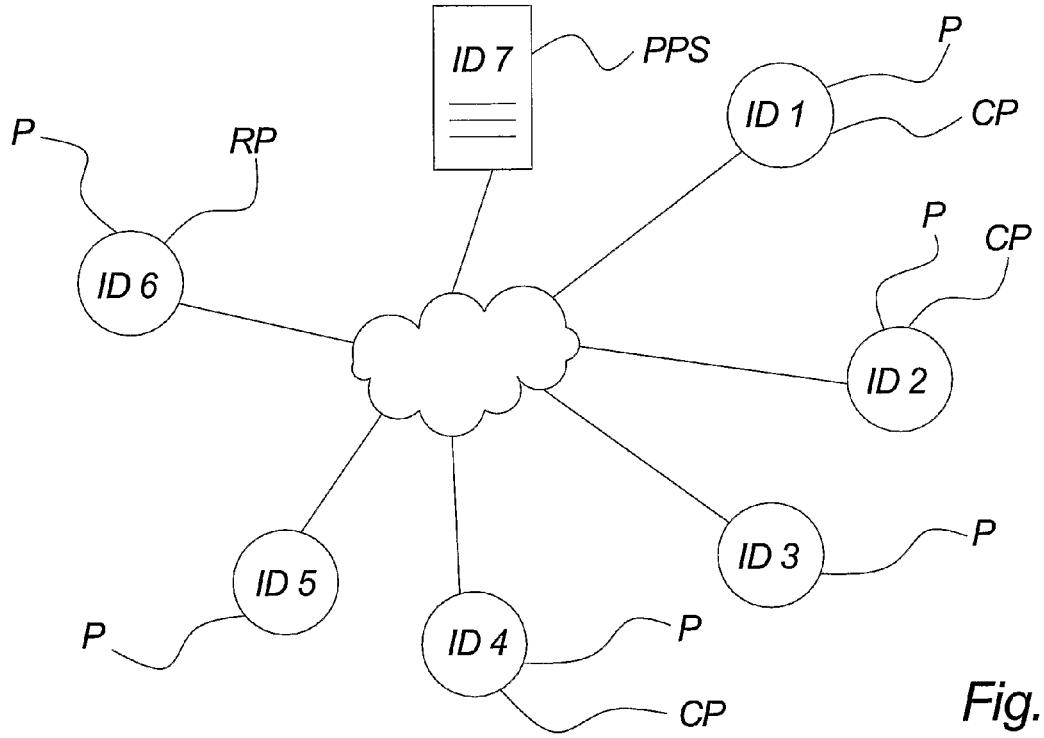
Figure 4:
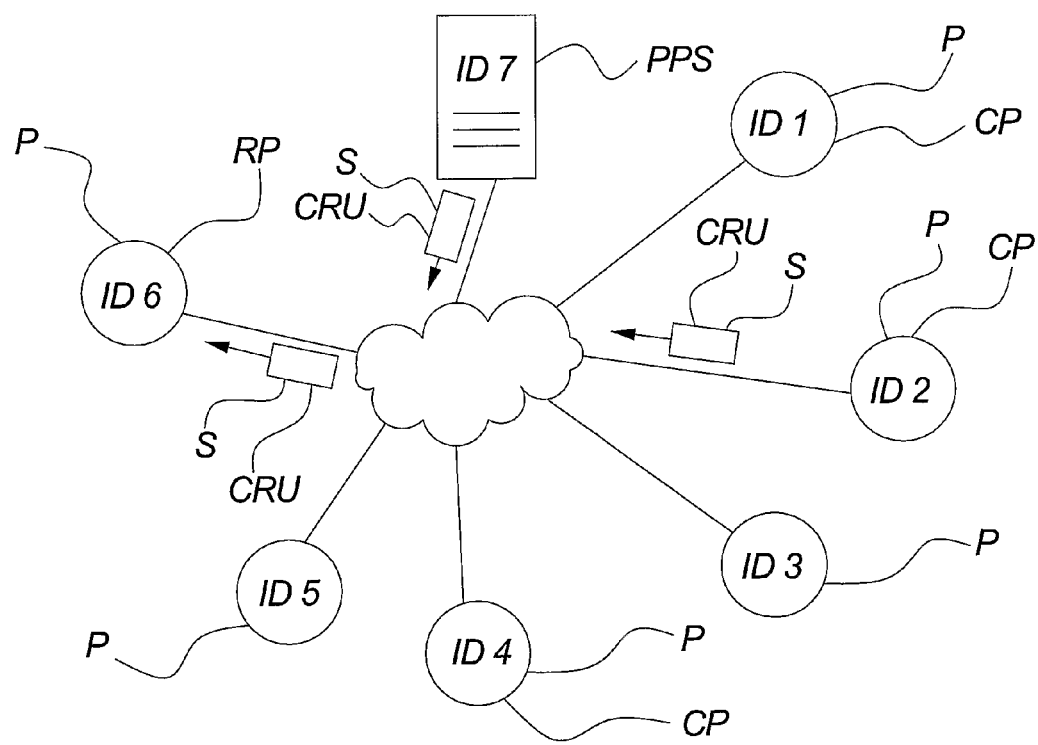
Figure 5:
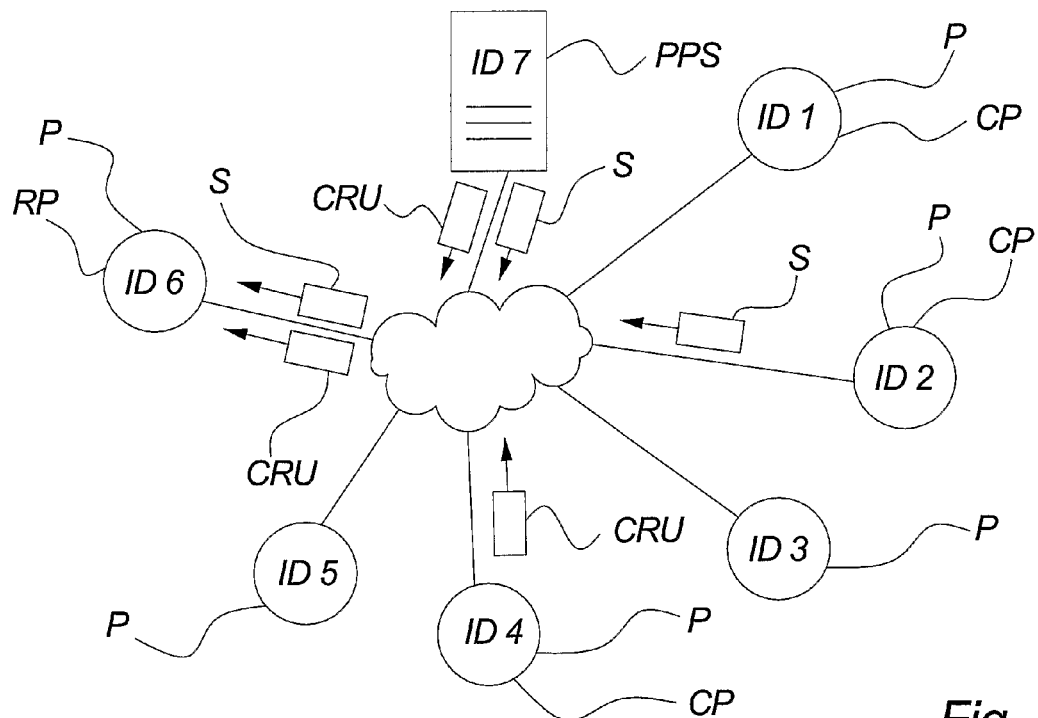
Figure 6:
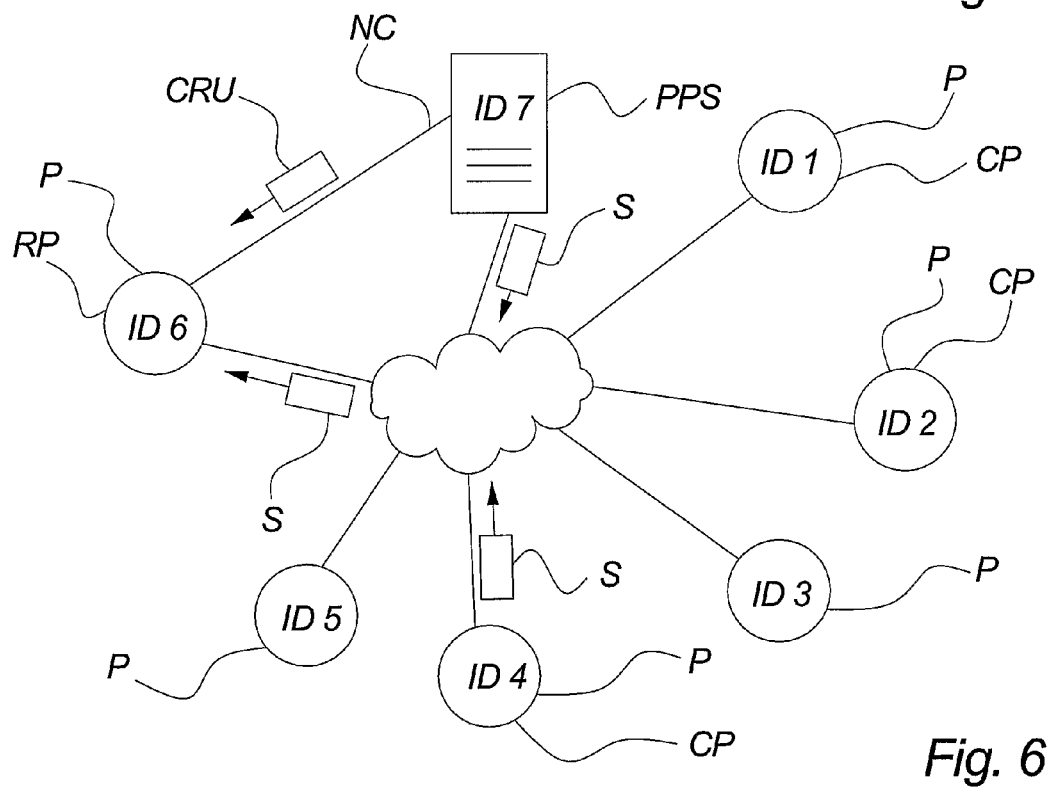
Figure 7:
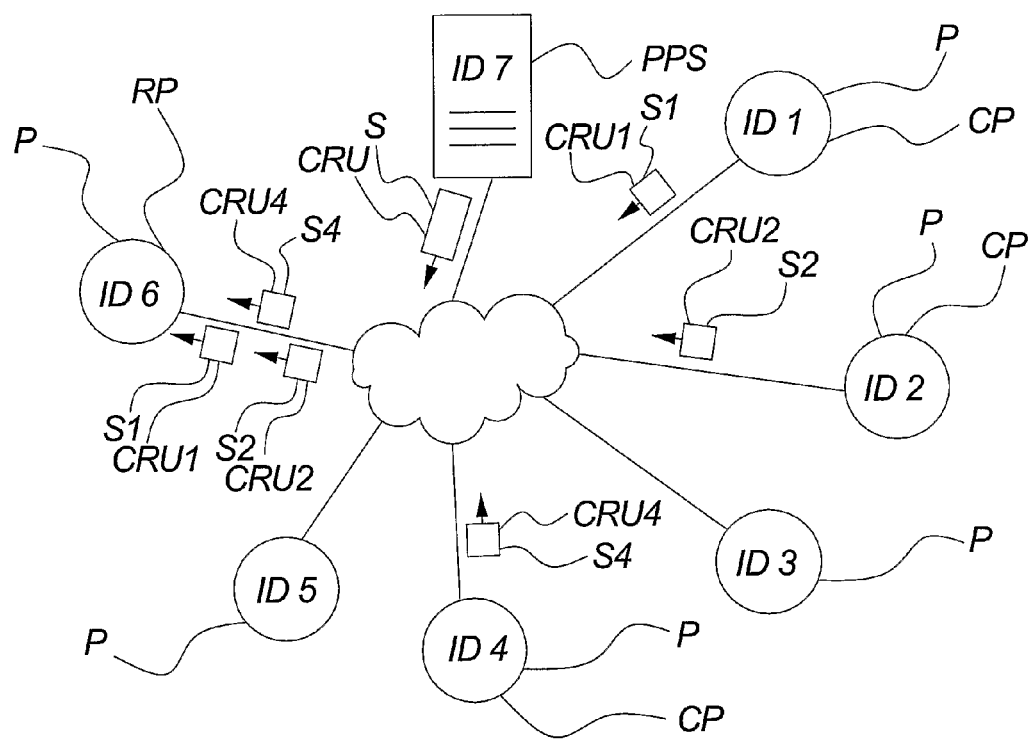
Figure 8A:
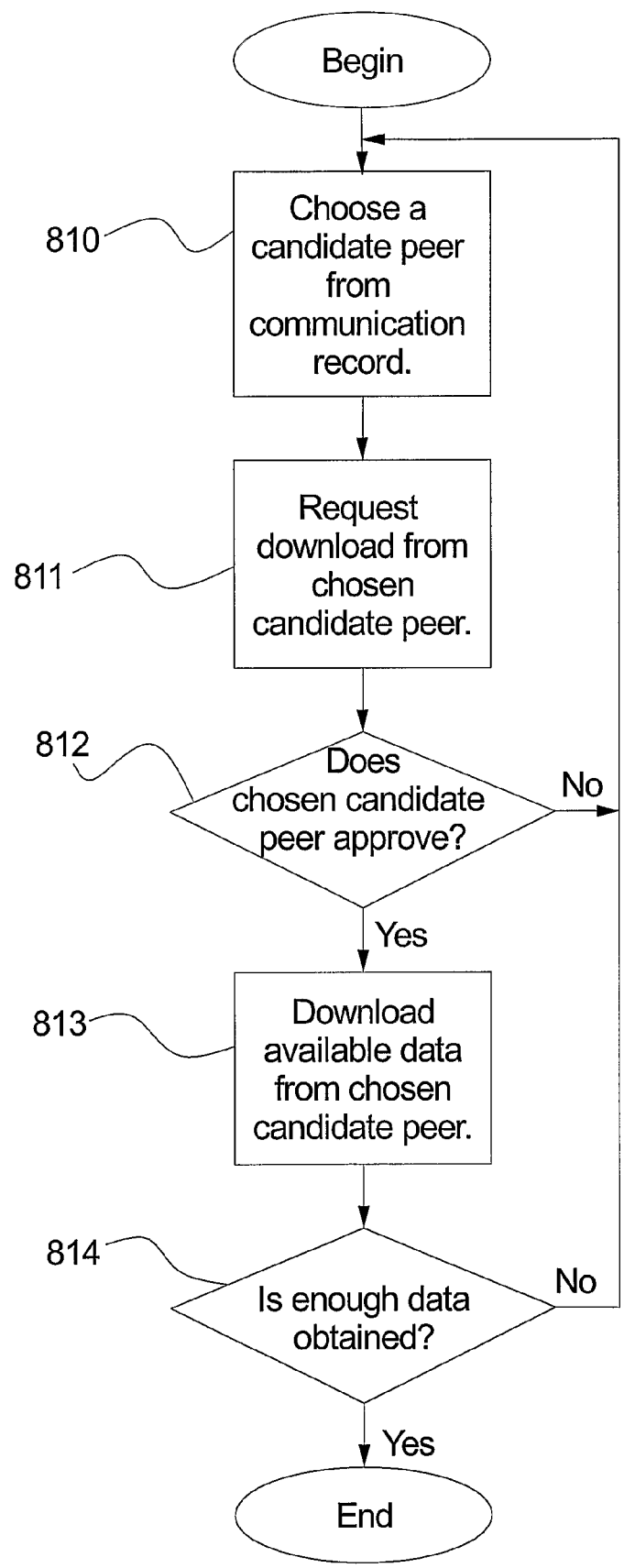
Figure 8B:
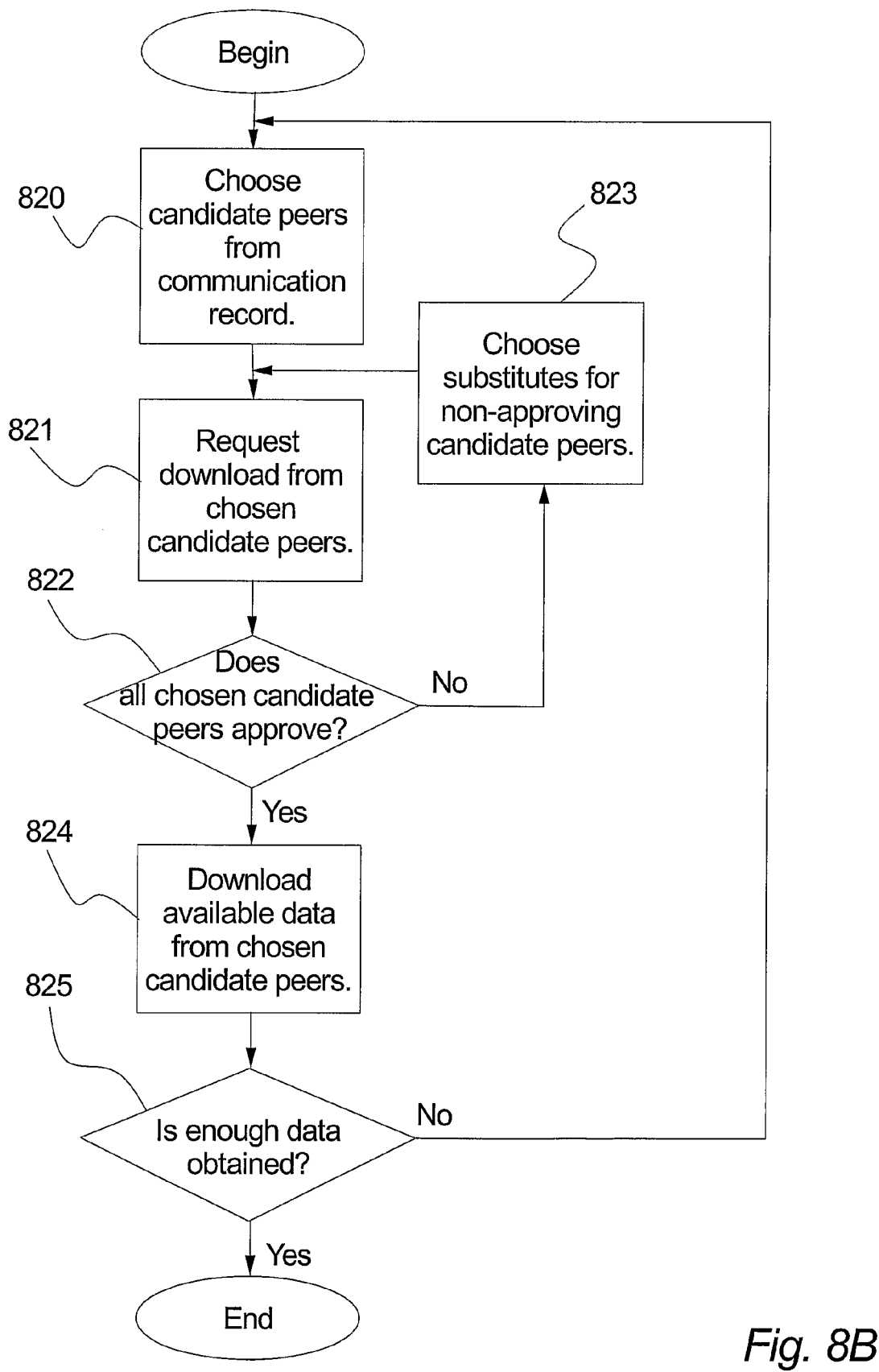
Figure 9:
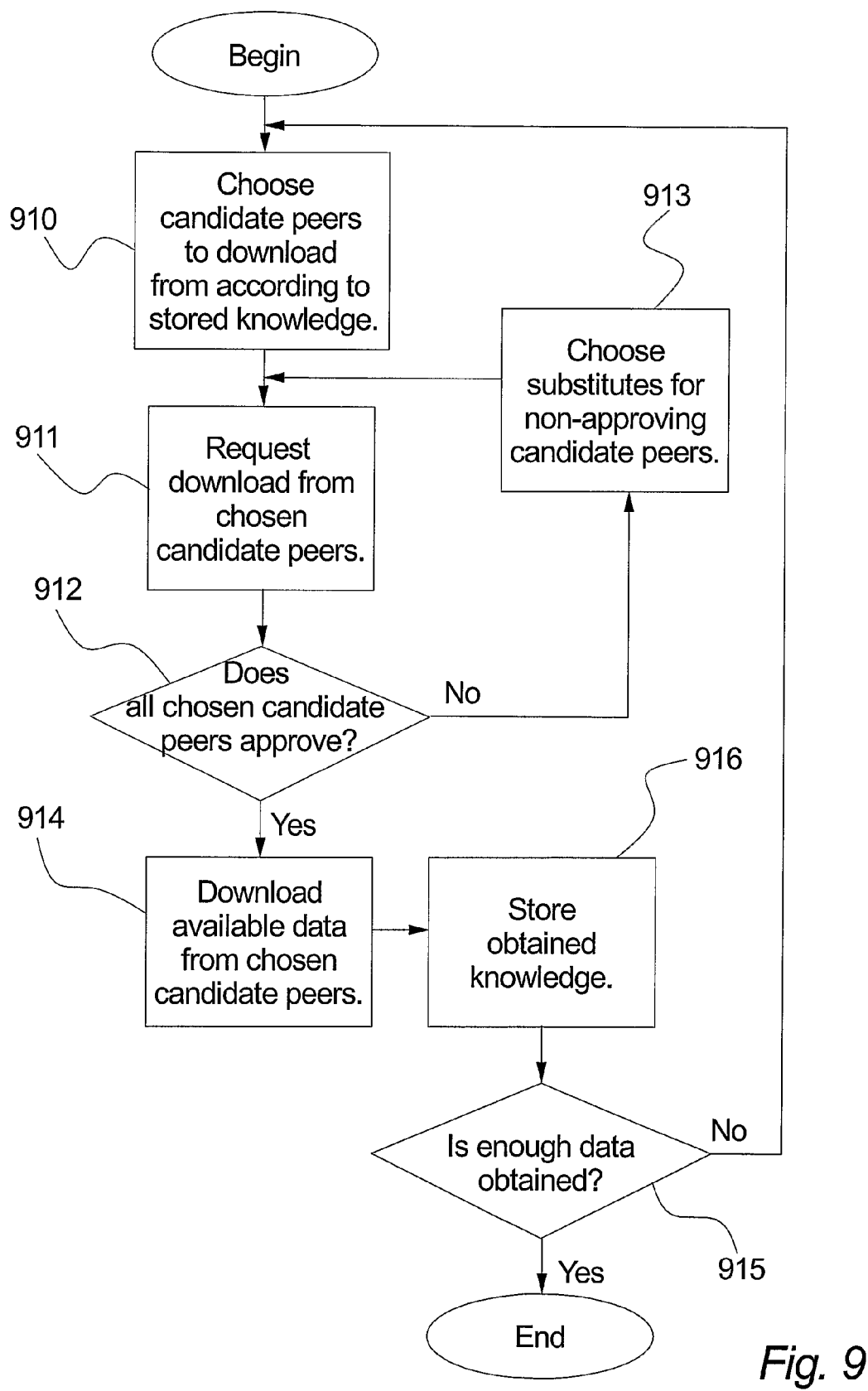
Figure 10:
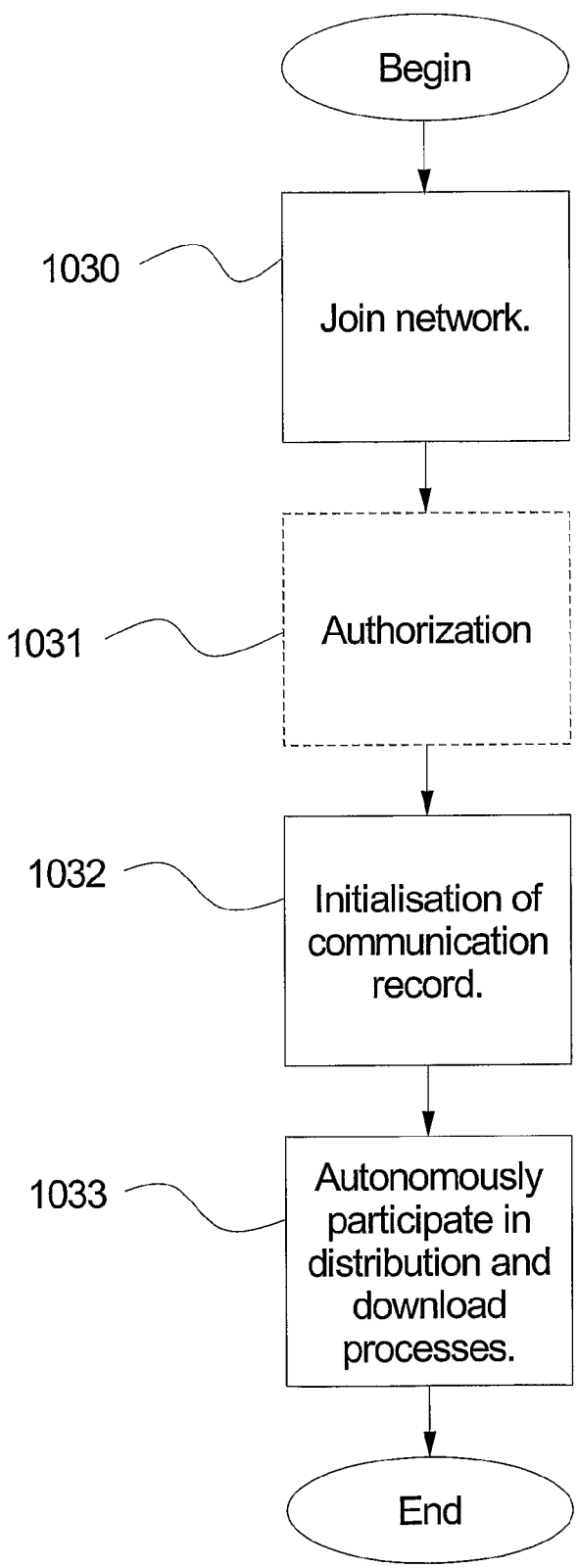

The invention will in the following be described with reference to the drawings where FIG. 1 illustrates an embodiment of a peer-to-peer network according to the present invention, FIG. 2 illustrates an embodiment of a peer-to-peer network comprising recipient peers, candidate peers and communication records, FIG. 3 illustrates an embodiment of a peer-to-peer network comprising a peer-to-peer network server, FIG. 4 illustrates an embodiment of a method for information and update distribution, FIG. 5 illustrates a further embodiment of a method for information and update distribution, FIG. 6 illustrates a further embodiment of a method for information and update distribution, FIG. 7 illustrates a preferred embodiment of a method for information and update distribution, FIGS. 8A and 8B illustrates simple autonomy of a peer facilitated by the present invention, FIG. 9 illustrates more advanced autonomy of a peer facilitated by the present invention, and FIG. 10 illustrates an embodiment of a peer initialisation process.

DETAILED DESCRIPTION

FIG. 1 illustrates an embodiment of a peer-to-peer network NW according to the present invention. It comprises a plurality of peers P connected through the network NW. The network is preferably a TCP/IP-based network such as e.g. the internet, but may be any kind of network. The peers are preferably computers of any kind, but may be any kind of apparatuses comprising means for communicating with other peers through the network. The peers may e.g. comprise personal computers, servers, PDA's, mobile phones, laptops, set-top boxes, public info-stands, etc. The network connections may comprise any kind of wired or wireless connections and any means necessary for establishing such connections, e.g. UTP cables of any category, coaxial cables, network interface cards, routers, firewalls, switches, hubs, wireless network interface cards, wireless routers, infrared, radio-frequency or Bluetooth connections, modems, cable modems, ADSL routers, ISDN modems, telephone cables, mobile phone connections, etc., and any possible network protocol or combination of protocols, e.g. Ethernet, token ring, wireless Ethernet, TCP/IP, IPX/SPX, GPRS, ADSL, ISDN, etc.

FIG. 2 illustrates an embodiment of a peer-to-peer network NW as described above, but seen from a certain recipient peer's point of view. It comprises a plurality of peers P whereof a certain one is referred to as recipient peer RP. A certain number of peers P are also referred to as candidate peers CP, as they from the point of view of the recipient peer RP may be candidates to peers from where the recipient peer RP may download information. The peers are associated with identity representations ID, e.g. ID1, ID2, etc. The recipient peer RP comprises a communication record CR, which preferably comprises a list of the peers that serve as candidate peers CP, which in the example of FIG. 2 comprises the peers associated with identity representations ID1, ID2 and ID4.

The content of the communication record CR may however be any set of information that may serve to support the peer in its tasks within the network. Such information may thus comprise, e.g., identity representations of other peers, categorization information about other peers, performance information about other peers or different network parts, information about network topology or other structural information, routing information, information about the computer configuration of other peers, e.g. NAT configuration, compatibility information, authorization and/or cryptography information, etc.

The peers P may furthermore in an embodiment of the invention comprise means for retaining information about their individual or common experiences, measurements, decisions, etc., in order to facilitate adaptive individual or common routines or artificial intelligence within the peers. Such information may in certain embodiments be stored within the communication record CR.

The communication record CR is preferably frequently updated to reflect changes in the information it stores, and the necessary updates are preferably received from other peers or a server, and preferably as an integrated part of information otherwise received, e.g. an audio or video live stream.

It is emphasized that the recipient peer RP as well as the candidate peers CP are instances of peers P, and that it is perfectly possible and even preferred that a peer act as several kinds of peers simultaneously. Hence the peer that is shown as recipient peer RP in FIG. 2 may be a candidate peer to one or more of the other peers. In a simple embodiment all peers are candidate peers and recipient peers, and the communication records hence comprises all peers, and any peer may download information from any one or more of the other peers.

A more advanced, preferred embodiment of the present invention comprises the candidate peers to not allow download by any recipient peer not mentioned in the communication record, or mentioned as a somehow disallowed peer. As this may cause problems for new peers starting to request downloads before the communication record update comprising their identity representation has propagated through the network to the candidate peers, an even more preferred embodiment may allow candidate peers to communicate with the unmentioned peer for a reasonable time allowing any updates to propagate, after which the final decision is taken on the basis of any new information.

FIG. 3 illustrates an embodiment of a peer-to-peer network according to the present invention. It is equal to FIG. 2, except for a peer-to-peer network server PPS that is also connected to the network in the embodiment of FIG. 3. The server PPS is in principle just another instance of a peer P, which may be constituted by any of the peers. In many real systems the server PPS is however due to other circumstances embodied by special equipment, and may not necessarily be exchangeable with the other peers. It is however noted that in certain embodiments any one or a number of the peers P may act as server PPS, thereby facilitating the ordinary user to, e.g., broadcast live video or audio streaming. It is furthermore noted that the scope of the present invention does not restrict the network to comprise only one server PPS.

The server PPS preferably maintains an up-to-date communication record and maintains the communication record of the peers accordingly by transmitting updates to the peers in one of several possible ways. The updates should be frequent, however not necessarily regular.

The server PPS further preferably comprises information to be broadcasted, e.g. live video or audio streams, or any other kind of information available for encoding into a network transmittable format, e.g. media files, document files, computer programs, databases, etc. The server PPS thus initiates and possibly maintains the establishment of downloadable information representations data S in at least some of the peers of the network.

FIG. 4 illustrates how a recipient peer RP may download information and communication record updates, preferably established by the server. The embodiment of FIG. 4 equals the embodiment of FIG. 3 except for the representations of information. The figure illustrates how the server provides an information representative data S and a communication record update CRU to the network. In the embodiment of FIG. 4, the information representative data S and the communication record update CRU are bundled in a single unit. The recipient peer RP, which comprises means for downloading information representative data S from a candidate peer CP receives a bundle comprising an information representative data S and a communication record update CRU from the candidate peer identified by identity representation ID2 in the embodiment of FIG. 4. The bundle received from the candidate peer is preferably a copy of the bundle provided by the server, or it is established on the basis of data from the server. The candidate peer may have received the bundled directly from the server or from a peer that serves as candidate peer to it when it is acting as recipient peer RP.

It is noted that FIG. 4 and the other drawings illustrate specific instances at specific times, and hence developments over time are not shown. Thus, e.g., the next information representative data S and communication record update CRU that the recipient peer receives may be downloaded from the same, i.e. ID2, or a different candidate peer.

The information representative data S may represent the information to be broadcasted by any available encoding, and further encoding or decoding may be applied during the distribution process. The information representative data S may during distribution be contained by a single self-contained data packet or stream of packets, or it may be subject to an encoding that establishes a plurality of data packets, whereof a certain amount represents the information representative data S, e.g. a loss resiliency enabling encoding. When the last applies networks based on a grid structure are facilitated as the different packets may be distributed along different paths.

The communication record update CRU may be bundled with the information to be broadcasted before that is arranged into an information representative data S and thus undergo the same encoding routine as the broadcast information, or the broadcast information undergo a full or partially encoding routine before the bundling. Moreover, also the communication record update CRU may be encoded in any possible way, e.g. by using compression techniques, before, under or after the encoding of the broadcast information.

The communication record update CRU preferably comprises only information about changes in the communication record CR, rather than the full communication record itself. The last option or any combination is however within the scope of the present invention, and may be advantageous in certain embodiments, e.g. in order to, by certain intervals, ensure that all peers comprise a true up-to-date copy of the communication record.

The establishment, encoding and distribution of information representation data S may conform to any network distribution method, e.g. live streaming methods, on demand methods streaming methods, file sharing methods, etc., whether or not comprising cryptography, authorization, loss resiliency, packet splitting, compression, etc., and whether or not transmitted by reliable, secure, connection-oriented protocols, or any combinations thereof. The method is in a preferred embodiment a loss resilient streaming distribution method, as, e.g., the method disclosed by international patent application no. PCT/DK2004/000197 hereby incorporated by reference, but any other suitable method is within the scope of the present invention.

The above-mentioned international patent application discloses a method for distributing an information, e.g. a live video stream, from a server to several peers wherein some or all of the peers establishes loss resilient code representations of the information on the basis of intermediate representations established by the server. By downloading a certain amount of the loss resilient code representations from the other peers, the original information may be established at the peers.

FIG. 5 comprises the same overall network structure as the previous drawings, but illustrates a different distribution method. In the embodiment of FIG. 5 the server PPS provides an information representative data S and a communication record update CRU as two different distribution units. The recipient peer RP thus has the option of downloading the two units from different candidate peers CP. In the example of FIG. 5 the recipient peer thus receives the information representative data S from the candidate peer identified by ID2 while it receives the communication record update CRU from the candidate peer identified by ID4. As mentioned above the illustration is merely of an instance at a specific time, and the recipient peer may at other times receive the units from different candidate peers or from one and the same peer.

As with the embodiments described above, both the information S and the update CRU may be distributed by any method and be encoded by any encoding scheme.

FIG. 6 again comprises the same network as described above, and the information representative data S is distributed as described above. The communication record update CRU is however provided in a more direct fashion to the recipient peer RP by the server PPS via an additional network connection NC. The additional network connection may be any connection whether comprising parts of the network used for distributing the information representative data S or not. The example of FIG. 6 thus represents embodiments where the server is transmitting updates more directly to the peers either by a simple direct dedicated line or by a long winding Internet path, etc.

FIG. 7 illustrates a preferred embodiment of the present invention. It comprises again the network described above. A server PPS provides for the network an information representative data S and a communication record update CRU, preferably bundled into one unit but may alternatively be separate units as described above. A recipient peer RP may download the information representative data S and the communication record update CRU in the form of several smaller data fractions S1 and CRU1, S2 and CRU2 and S4 and CRU4. These smaller data fractions may preferably be downloaded from different candidate peers CP in order to optimize network usage. In the example of FIG. 7 the data fractions are downloaded from the peers identified by ID1, ID2 and ID4. The recipient peer RP may establish an information corresponding to the information provided by the server PPS from a certain number of smaller data fractions.

The establishment of smaller data fractions S1, S2, S4, from the unit S provided by the server PPS may be performed in several ways. Some possible methods comprises the server splitting the information S into smaller data fractions which are distributed to certain peers, or the server providing the information S to a few peers which establishes the smaller data fractions for easier distribution.

According to the present invention a preferred method of establishing the smaller data fractions S1, S2, S4, from the information representative data S is disclosed in the above-mentioned international patent application no. PCT/DK2004/000197 hereby incorporated by reference. This method comprises having a server PPS establishing from the information representative data S relatively few, e.g. 4 or 8, code segments whereof a certain number is required for re-establishing the information. These code segments are preferably distributed to different peers, which on request from other peers, e.g. candidate peers, establish preferably even smaller intermediate packets on the basis of the code segments. A peer, e.g. a candidate peer, may transform a certain number of these smaller intermediate packets into a number of data fractions S1, S2, S4, of which a certain number must be collected in order to re-establish the original information. The data fractions preferably represent the information in a loss resilient way, i.e. in such a way that the recipient peer is able to decode the information as soon at it has downloaded a predetermined number of arbitrary unique unordered data fractions S1, S2, S4.

It is again emphasized that in a preferred embodiment any of the peers may comprise several peer roles in order to improve the network performance and time and bandwidth used for distribution. Hence a single peer, e.g. implemented as a personal computer with an ADSL connection to the Internet, may act as recipient peer if the user wants to, e.g., see live video, but at the same time it may act as a candidate peer to other peers, thus participating in the distribution of the information.

In order to illustrate the autonomy facilitated by the present invention FIGS. 8A, 8B and 9 are provided. A basis for autonomous peers in the present invention is the maintained communication record CR comprising substantially current information on the other peers, the network and/or both.

FIG. 8A comprises a flow chart showing the steps performed by a recipient peer RP according to an embodiment of the present invention in order to download information from one candidate peer CP. First step 810 comprises the recipient peer using the information in the communication record to choose a candidate peer. The decision may be based on algorithms of any level of complexity, i.e. from merely choosing from the end of the list or randomly or pseudo randomly, to advanced prediction algorithms or other advanced algorithms. The second step 811 comprises requesting the chosen candidate peer to transmit data. According to the type of distribution method and the topology of the network, this step may comprise different acts.

Decision box 812 controls the next step on the basis of the outcome of the request made in step 811. If the candidate peer agrees to transmit data, step 813 is performed and available data downloaded to the recipient peer. The candidate peer, the recipient peer or other circumstances may in various embodiments determine the extent of available data, i.e. if the recipient peer should download all relevant data from the candidate peer, or only a part of it. Either the candidate peer or the recipient peer may, e.g., choose to abort the transmission if the network connection between the two peers is two slow or unreliable.

When the available data has been downloaded, decision box 814 controls the action. If no more data is needed the download is considered finished. If however the amount of data received is not sufficient the recipient peer may start over by choosing a candidate peer. The situation where not enough data is downloaded may, e.g., arise due to unforeseen circumstances such as the candidate peer aborting transmission, or the candidate peer not possessing more data or is for some reason not allowed to transmit it. It may also arise when the data comprises a live audio or video streaming, which involves continuously downloading of data, and the candidate peer itself becomes unavailable or stops downloading the data itself.

Also when the recipient peer does not get approval from the chosen candidate peer in connection with decision box 812 the recipient peer has to start over by choosing another candidate peer. Reasons for not getting approval may comprise, in addition to a simple refusal, not being able to contact the candidate peer, the candidate peer not possessing the necessary data, the interfaces being incompatible with each other, or any other reason which may lead to the decision of trying with another candidate peer.

FIG. 8B illustrates the steps for a slightly different embodiment of the present invention where the recipient peer may download from several candidate peers simultaneously or alternately. In this embodiment the recipient peer starts by choosing one or more candidate peers from the communication record, step 820, and requests download from all or at least a plurality of them. If the candidate peers approve the request, decision box 822, the recipient peer start downloading data. When all available data has been downloaded from the chosen peers and that is not enough, the recipient peer may start over by choosing other candidate peers.

The difference from the flow chart of FIG. 8A is the step 823 comprising the action to take if some or all of the first chosen candidate peers refuses the download. In the present embodiment the recipient peer should then choose other candidate peers substituting the ones that are unavailable. During this loop of substituting and requesting, the recipient peer may perfectly proceed to the step 824 of downloading from candidate peers that are found ready and relevant.

It is noted that all observations relating to alternatives according to the embodiment of FIG. 8A also apply to the present embodiment of FIG. 8B.

The embodiments of FIGS. 8A and 8B are relatively simple algorithms but do however facilitate autonomous peers, e.g. due to the free choice of which candidate peers to utilize, and the possibility for negotiating custom conditions with the available chosen candidate peers, of course within the limitations defined by the actual hardware and/or software framework.

FIG. 9 comprises an example of a download algorithm a little more advanced, which facilitates artificial intelligence and adaptability, thereby improving the performance increase produced by the added autonomy. The flow of the embodiment of FIG. 9 is in principle the same as that of FIG. 8B, but an additional factor has been added. In the present embodiment the recipient peer bases its choice of candidate peers not only on the data in the communication record maintained from outside itself, but also on stored knowledge, i.e. calculations, observations, experiences, etc., that the recipient peer has obtained itself. The embodiment of FIG. 9 comprises a further addition compared to the embodiment of FIG. 8B as it also stores newly obtained knowledge at some point within the algorithm, for example after each download completes, step 916.

It is noted that all observations relating to alternatives according to the embodiment of FIGS. 8A and 8B also apply to the present embodiment of FIG. 9. It is furthermore noted that any algorithm suitable for choosing one or more peers and downloading from them according to the present invention is within the scope of the present invention.

As described above the communication record is a major part of enabling the peers to act autonomously. As also described above it may advantageously be maintained by updates comprised by the data otherwise downloaded by the peers, e.g. a live audio or video stream. When a peer not already receiving the stream and thereby the updates wants to participate it has to somehow establish the current communication record.

FIG. 10 comprises an example of how a peer may join the distribution network according to the preset invention. A first step 1030 comprises the peer connecting to the network, preferably by establishing a communication with the server PPS. A next step 1031 comprises the peer authorizing itself, preferably against the server. This step may be optional if the distribution network is a private network or everyone is allowed to receive the content distributed by the network. The third step 1032 comprises initialisation of the communication record. This is crucial in order for the peer to be able to perform autonomous decision-making, as the communication record preferably comprises at least the identity representations of other connected peers. The initialisation of the communication record may be done by several methods. The simplest method comprises the server transmitting its copy of the communication record directly to the recently connected peer. Other methods may however be more advantageous in certain embodiments. When the peer-to-peer network is huge and comprises numerous peers, the communication record may become relatively large and possibly impossible for the server to transmit directly to every new connecting peer. In such a system the server may transmit only a fraction of the communication record comprising, e.g., the identity representations of 100 other peers. The newly connected peer may then obtain the rest of the communication record from these 100 peers, whereby the bandwidth-heavy task of transmitting a huge database is distributed among several peers. As soon as the newly connected peer has received enough of the communication record to participate in the regular information and update distribution, step 1033, it is inherently able to maintain its communication record onwards.

The invention claimed is:

1. A method comprising
   providing a plurality of peers on a peer-to-peer network;
   providing at least one peer-to-peer network server for the peer-to-peer network;
   providing a communication record maintained by a specific peer of the plurality of peers, wherein:
      the communication record defines a plurality of candidate peers that are a subset of said plurality of peers that have a specific data item,
      the communication record is provided prior to a request to download said specific data item,
      the communication record is one of a plurality of distributed communication records, each of the plurality of communication records being maintained at a different peer of the plurality of peers, the communication records providing information on which to facilitate autonomous decision making at each of the plurality of peers, and the at least one peer-to-peer network server controlling updates of the communication record to the plurality of peers;

downloading, by the specific peer of the plurality of peers, the specific data item from at least one candidate peer of the plurality of candidate peers according to an individual routine of the specific peer and based on the communication record, said individual routine providing a first decision making process for the specific peer on how to download said specific data item;

receiving, by said specific peer, at least one communication record update from a peer-to-peer network server of the at least one peer-to-peer network server via said candidate peers on a runtime basis according to the individual routine, wherein said individual routine provides a second decision making process for the specific peer on how to download said at least one communication record update; and updating the communication record based, at least in part, on the at least one communication record update.

2. The method of maintaining a communication record according to claim 1, wherein said receiving the at least one communication record update via the candidate peers is performed according to said individual routine of the peer.

3. The method of maintaining a communication record according to claim 1, wherein said individual routine comprises guidelines for deciding, on a runtime basis, which at least one of said candidate peers to download said information representative data from.

4. The method of maintaining a communication record according to claim 1, wherein said individual routine comprises guidelines for deciding, on a runtime basis, a number of said candidate peers to download said information representative data from.

5. The method of maintaining a communication record according to claim 1, wherein the peer downloads said information representative data from a plurality of said candidate peers substantially simultaneously.

6. The method of maintaining a communication record according to claim 1, wherein the peer-to-peer network server transmits said information representative data to at least one of said plurality of peers of the peer-to-peer network.

7. The method of maintaining a communication record according to claim 1, wherein a plurality of said peers are associated with a unique identity representation.

8. The method of maintaining a communication record according to claim 7, wherein said communication record defines said candidate peers by said associated identity representation.

9. The method of maintaining a communication record according to claim 1, wherein the communication record is initialized by the peer-to-peer network server.

10. The method of maintaining a communication record according to claim 1, wherein said information representative data comprises a video or audio stream.

11. The method of maintaining a communication record according to claim 1, wherein the peer-to-peer network comprises a streaming network.

12. The method of maintaining a communication record according to claim 1, wherein the peer-to-peer network comprises a grid-based peer-to-peer network.

13. The method of maintaining a communication record according to claim 1, wherein the communication records of a plurality of the peers of the peer-to-peer network are substantially identical.

14. The method of maintaining a communication record according to claim 1, wherein said communication record defines a subset of said plurality of peers of the peer-to-peer network to which information representative data may be uploaded.

15. The method of maintaining a communication record according to claim 1, wherein at least two of said plurality of peers of the peer-to-peer network downloads said information representative data substantially simultaneously.

16. The method of maintaining a communication record according to claim 1, wherein said information representative data is arranged to comprise said communication record update.

17. The method of maintaining a communication record according to claim 1, wherein said communication record update is associated and transmitted with said information representative data.

18. The method of maintaining a communication record according to claim 1, wherein accumulating said communication record updates on the average accounts for less than 20% of the size of accumulated said information representative data (S).

19. The method of maintaining a communication record according to claim 1, wherein said communication record update comprises a completed version of the communication record.

20. The method of maintaining a communication record according to claim 1, wherein the communication record defines further properties or features of the peers it defines.

21. The method of maintaining a communication record according to claim 1, wherein the communication record defines properties or features of said information representative data.

22. The method of maintaining a communication record according to claim 1, wherein said information representative data is encoded and distributed according to a loss resiliency method.

23. The method of maintaining a communication record according to claim 1, wherein said communication record update is distributed by a method corresponding to the method applied for distributing information representative data.

24. The method of maintaining a communication record according to claim 1, wherein said information representative data may comprise multiple information instances.

25. The method of maintaining a communication record according to claim 24, wherein the communication record defines said information instances of said information representative data.

26. The method of maintaining a communication record according to claim 1, wherein said candidate peers are not equally performing.

27. The method of maintaining a communication record according to claim 1, wherein said individual routine comprises trial and error algorithms.

28. A peer comprising a specific peer of a plurality of peers on a peer-to-peer network where said peer-to-peer network comprises at least one peer-to-peer network server, wherein the specific peer of said plurality of peers comprises a communication record and is configured to maintain the communication record defining a plurality of candidate peers that are a subset of said plurality of peers that have a specific data item, the communication record is one of a plurality of distributed communication records, each of the plurality of communication records being comprised at a different peer of the plurality of peers, the communication records comprising information on which to facilitate autonomous decision making at each of the plurality of peers, and the at least one peer-to-peer network server is configured to control updates of the communication record to the plurality of peers;

said specific peer of the plurality of peers being configured to download the specific data item from said at least one candidate peers of the plurality of candidate peers according to an individual routine of the specific peer and based on the communication record, said individual routine providing a first decision making process for the specific peer on how to download said specific data item;

said specific peer being configured to receive at least one communication record update from a peer-to-peer network server of the at least one peer-to-peer network server via said candidate peers on a runtime basis according to the individual routine, wherein said individual routine provides a second decision making process for the specific peer on how to download said at least one communication record update; and said specific peer being configured to update the communication record based, at least in part, on the at least one communication record.

29. The communicating apparatus according to claim 28, wherein said peer performs said maintaining said communication record at least partly on the basis of said communication record updates.

30. The communicating apparatus according to claim 28, wherein said individual routine comprises guidelines for deciding, on a runtime basis, which at least one of said candidate peers to download said information representative data from.

31. The communicating apparatus according to claim 28, wherein said individual routine comprises guidelines for deciding, on a runtime basis, a number of said candidate peers to download said information representative data from.

32. The communicating apparatus according to claim 28, wherein said peer downloads said information representative data from a plurality of said candidate peers substantially simultaneously.

33. The communicating apparatus according to claim 28, wherein said peer-to-peer network server transmits said information representative data to at least one of said plurality of peers of said peer-to-peer network.

34. The communicating apparatus according to claim 28, wherein a plurality of said peers are associated with a unique identity representation.

35. The communicating apparatus according to claim 28, wherein said communication record defines said candidate peers by said associated identity representation.

36. The communicating apparatus according to claim 28, wherein said communication record is initialized by said peer-to-peer network server.

37. The communicating apparatus according to claim 28, wherein said information representative data comprises a video or audio stream.

38. The communicating apparatus according to claim 28, wherein said peer-to-peer network comprises a streaming network.

39. The communicating apparatus according to claim 28, wherein said peer-to-peer network comprises a grid-based peer-to-peer network.

40. The communicating apparatus according to claim 28, wherein said communication records of a plurality of peers of said peer-to-peer network are substantially identical.

41. The communicating apparatus according to claim 28, wherein said communication record defines a subset of said plurality of peers of said peer-to-peer network to which information representative data may be uploaded.

42. The communicating apparatus according to claim 28, wherein at least two of said plurality of peers of said peer-to-peer network downloads said information representative data substantially simultaneously.

43. The communicating apparatus according to claim 28, wherein said information representative data is arranged to comprise said communication record update.

44. The communicating apparatus according to claim 28, wherein said communication record update is associated and transmitted with said information representative data.

45. The communicating apparatus according to claim 28, wherein accumulated said communication record updates on the average accounts for less than 20% of the size of accumulated said information representative data (S).

46. The communicating apparatus according to claim 28, wherein said communication record update comprises a complete communication record.

47. The communicating apparatus according to claim 28, wherein said communication record defines further properties or features of the peers it defines.

48. The communicating apparatus according to claim 28, wherein said communication record defines properties or features of said information representative data.

49. The communicating apparatus according to claim 28, wherein said information representative data is encoded and distributed according to a loss resiliency method.

50. The communicating apparatus according to claim 28, wherein said communication record update is distributed by a method corresponding to the method applied for distributing information representative data.

51. The communicating apparatus according to claim 28, wherein said information representative data may comprise multiple information instances.

52. The communicating apparatus according to claim 51, wherein said communication record defines said information instances of said information representative data.

53. The communicating apparatus according to claim 28, wherein said candidate peers are not equally performing.

54. The communicating apparatus according to claim 28, wherein said individual routine comprises trial and error algorithms.

55. A peer-to-peer network comprising:
a peer-to-peer network server and a plurality of peers;
wherein a specific peer of said plurality of peers comprises a communication record and is configured to maintain the communication record defining a plurality of candidate peers that are a subset of said plurality of peers that have a specific data item,
the communication record is one of a plurality of distributed communication records, each of the plurality of communication records being comprised at a different peer of the plurality of peers, the communication records comprising information on which to facilitate autonomous decision making at each of the plurality of peers, and
the at least one peer-to-peer network server is configured to control updates of the communication record to the plurality of peers;
said specific peer of the plurality of peers being configured to download the specific data item from said at least one candidate peer of the plurality of candidate peers according to an individual routine of the specific peer and based on the communication record, said individual routine providing a first decision making process for the specific peer on how to download said specific data item;

said specific peer being configured to receive at least one communication record update from a peer-to-peer network server of the at least one peer-to-peer network server via said candidate peers on a runtime basis according to the individual routine, wherein said individual routine provides a second decision making process for the specific peer on how to download said at least one communication record update; and said specific peer being configured to update the communication record based, at least in part, on the at least one communication record.

* * * * *